March 3, 1964

R. W. KEARNS ETAL

BI-DIRECTIONAL STEP MOTOR DRIVE VOLTAGE
DIVIDER SWITCHING APPARATUS

3,123,753

Filed May 16, 1960

INVENTORS
ROBERT W. KEARNS &
BY KENNETH J. LAW

Donnelly, Mentag & Harrington
ATTORNEYS

March 3, 1964  R. W. KEARNS ETAL  3,123,753
BI-DIRECTIONAL STEP MOTOR DRIVE VOLTAGE
DIVIDER SWITCHING APPARATUS Filed May 16, 1960  3 Sheets-Sheet 2

INVENTORS
ROBERT W. KEARNS
BY KENNETH J. LAW
Donnelly, Mentag & Harrington
ATTORNEYS

INVENTORS
ROBERT W. KEARNS &
BY KENNETH J. LAW

ATTORNEYS

United States Patent Office 3,123,753
Patented Mar. 3, 1964

3,123,753
BI-DIRECTIONAL STEP MOTOR DRIVE VOLTAGE
DIVIDER SWITCHING APPARATUS
Robert W. Kearns, Detroit, and Kenneth J. Law, Redford Township, Wayne County, Mich., assignors to K. J. Law, Engineers, Detroit, Mich., a partnership
Filed May 16, 1960, Ser. No. 29,289
3 Claims. (Cl. 318—29)

The invention relates generally to electrical and electronic apparatus, and, more particularly to automatic switching devices to provide step by step voltage dividing functions and other related switching functions.

The primary object of this invention is to provide a compact reliable automatic step-by-step voltage divider and switching device, and to provide auxiliary switching in certain desired relation to the voltage divider position.

It is another object of this invention to provide an automatic voltage divider and switching device which may be operated in either direction from any position peviously assumed.

It is a further object of this invention to provide automatic stepping to bypass any undesired position, and to bypass the undesired position by stepping in the same direction as the pevious input signal caused the position to change.

It is another object of this invention to provide facility for manual operation by external manually operated circuit input signal devices such as switches.

It is still a further object of this invention to proivde an automatic voltage divider and switching device which may be hermetically sealed and provided with external terminals for all connections to the device without unsealing the enclosure.

It is still another object of this invention to provide an automatic voltage divider and switching device which is simple and compact in construction, electrically reliable, efficient and economical of manufacture.

It is another object of this invention to provide a versatile device which may be mounted in any position and able to withstand rough usage because of its rugged construction and reliability.

Other objects, features and advantages of this invention will be apparent from the following detailed description and appended claims, reference being had to the accompanying drawings forming a part of the specification wherein like reference numerals designate corresponding parts of the several views.

Before explaining in detail the present invention, it is to be understood that the invention is not limited in its application to the details of the diagrammatic arrangements and circuitry illustrated in the accompanying drawings, since the invention is capable of other embodiments and of being practiced or carried out in various ways. Also, it is to be understood that the phraseology or terminology employed herein is for the purpose of description and not of limitation.

Electrical and electronic apparatus of the nature of the present invention must be reliable, compact, provide functional versatility and be capable of operation in environs not amenable to such devices. They should be electrically reliable and physically reliable. Such a device should be able to operate under conditions of variable input supply voltage and with variable loads.

Furthermore it is most important that such devices be small and compact to best utilize available space in the electrical or electronic system in which it is to be used. As an example, in the design of portable ground control systems for missiles it is necessary to utilize as well as possible the available volume in the trailer into which such systems are installed. Each device provided for use in a system of this nature should be as compact as possible and yet sufficiently and reliably perform the operating functions desired. The environment for operational equipments in such a system must be considered as a primary factor in the design of apparatus for these purposes.

The present invention is designed to perform over a wide range of temperature, humidity, pressure, and corrosive atmosphere such as salt spray, rain, sand and dust. Further it is designed to perform in an explosive vapor atmosphere, to be fungus resistant, and to be able to withstand shock and vibration such as it will encounter in service.

Figure 1:
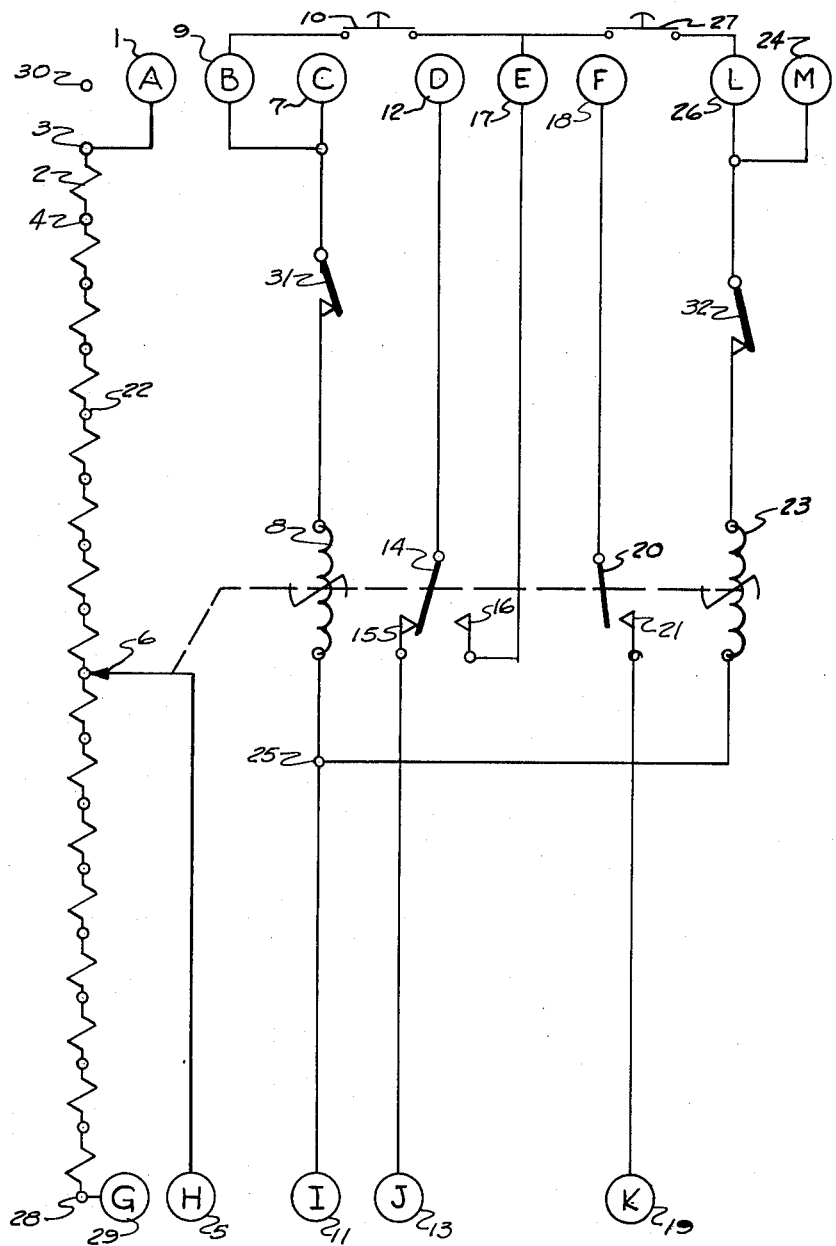
FIG. 1 is a functional circuit schematic diagram of the voltage dividing and switching system showing one embodiment of the present invention.

A schematic circuit diagram, illustrating by way of example, the electrical functional operation of one form embodying the principles of the invention is shown in FIG. 1. This schematic circuit diagram is not presented by way of limiting the invention to the form or circuit presented but to teach one form of the invention which may take any number of related forms. Then, in FIG. 1 the terminal 1 is a connection to one end of a voltage divider consisting of a series string of resistors 2 interposed between switch points as 3 and 4 and able to be connected to the output terminal 5 via the switching armature or movable wiper arm 6. The terminal 7 provides for connection to the indexing rotary relay increase motor 8 for the operation of the voltage divider in a step by step increasing positive potential or voltage output, with reference to the terminal 1 as the positive potential or voltage source connection and terminal 29 as the negative potential source connection. Terminal 9 provides for external manual operation by a manually operated remote switch 10 except when the wiper arm 6 is in the position shown in FIG. 1. Operation of the rotary relay increase motor 8 by either automatic or manual means is effected through the circuit return lead for which terminal 11 is provided.

In this embodiment of the invention the design has provided for operation from a 28 volt ±2 volt direct current source. This source positive potential terminal is to be connected to terminal 12 of FIG. 1, and return lead circuit connection is to be made to terminal 11. Operation of external electrical apparatus will normally take place in connection to terminal 13. External contacts from switches or relays may be interposed between contacts 12 and 7, and, contacts 12 and 24 to operate stepping motors as will be obvious in subsequent portions of this description.

The single pole double throw switch 14 is shown in the actuated condition as being connected through contact 15 to terminal 13 which is to be the arrangement when the voltage divider switch wiper arm 6 is in the position shown in FIG. 1. The S.P.D.T. switch 14 is to be unactuated for all other positions of the voltage divider switch wiper arm 6 and thus will connect the voltage source on terminal 12 to contact 16 and thus to terminal 17. Thus, the external manually operated switches 10 and 27 are able to operate the stepping motors 8 and 23 for all positions except when wiper arm 6 is in the position shown in FIG. 1.

Terminal 18 is to be connected to terminal 19 through the single pole single throw switch 20 and contact 21 whenever the voltage divider wiper arm 6 is connected to terminal point 22 and is to be disconnected for any other position. The wiper arm 6, the switches 14 and 20, and the motors 8 and 23 are mechanically interconnected as more fully described hereinafter and as indicated by the dashed line in FIG. 1.

The rotary relay decrease motor 23 is provided to index the voltage divider wiper arm 6 in the direction of decreasing positive potential when actuated automatically through input terminal 24. The return lead is then through connection 25 to common terminal 11. The terminal 26 is provided for manual operation via a manually operated remote switch 27, connected to terminal 17, which indexes the voltage divider in the descreasing positive potential direction except when the wiper arm 6 is in the position shown in FIG. 1.

The embodiment of the invention used for illustration utilizes standard eighteen position switch wafer sections, however only seventeen positions are shown to be used. The circuitry provided to automatically index the voltage divider wiper arm 6 from contact point 3 to contact point 28, which is connected to terminal 29, or from contact point 28 to contact point 3 through contact point 30, which is not used, will be explained as follows. When the input signal at terminal 7 or 9 occurs to cause indexing from contact point 3 to contact point 30 the interrupter switch 31 is actuated by a cam mechanism as provided with the rotary relay increase motor 8 by the manufacturer. The interrupter switch 31 opens when the rotary relay increase motor 8 is at the end of its operating stroke at point 30 thus breaking its own circuit and during energization of terminal 7 or 9 provides a second indexing operation moving the wiper arm to position 28. The applied signal duration must be a sufficient length of time to allow the two indexes to take place.

An analogous operation sequence takes place when terminal 24 or 26 is energized to index the wiper arm 6 from point 28 to point 30 through actuation of interrupter switch 32, causing a second index in the same direction to move the wiper arm 6 to point 3.

Figure 2:
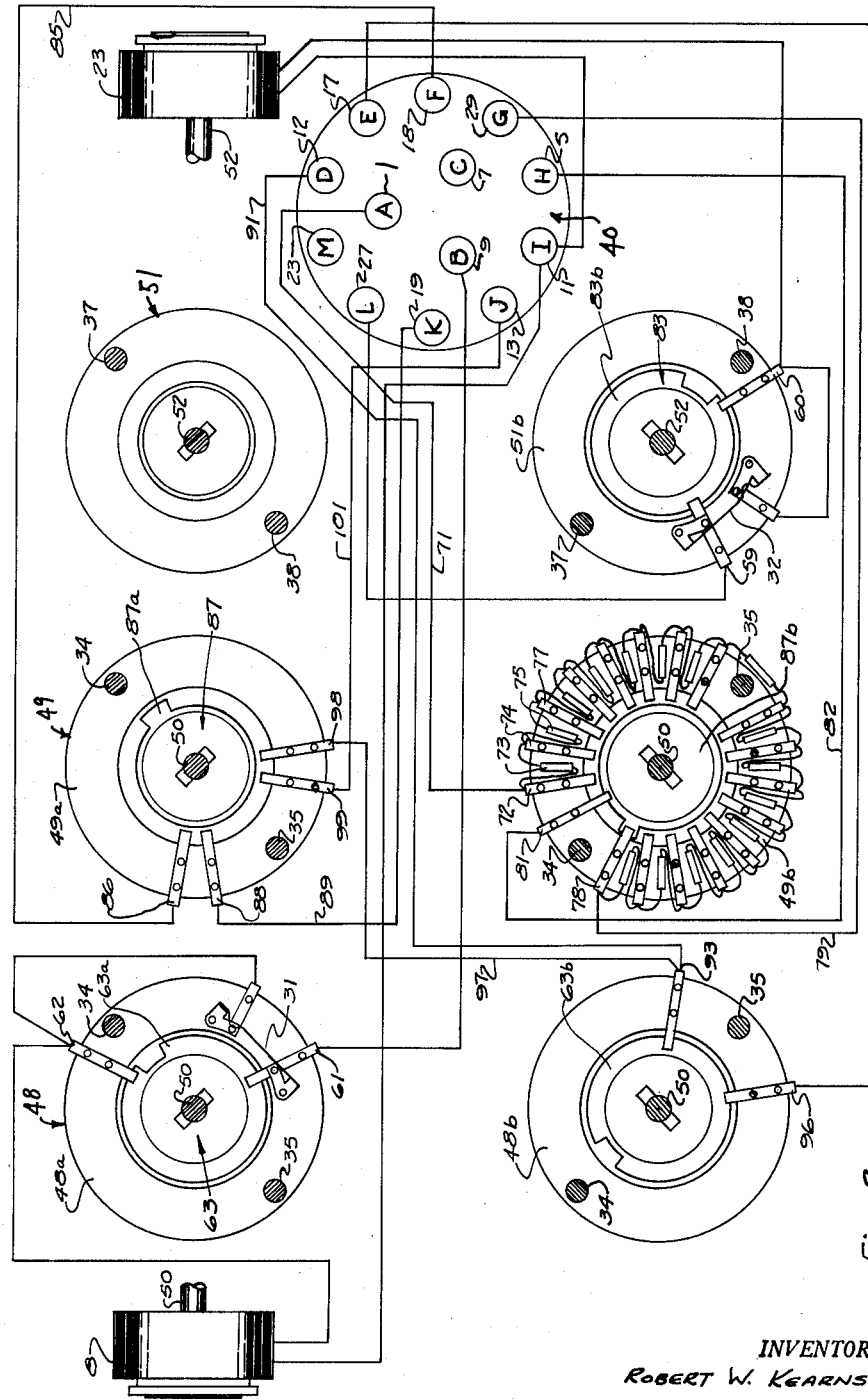
FIG. 2 is a wiring diagram and switch wafer assembly drawing showing a specific form of the present invention.
Figure 4:
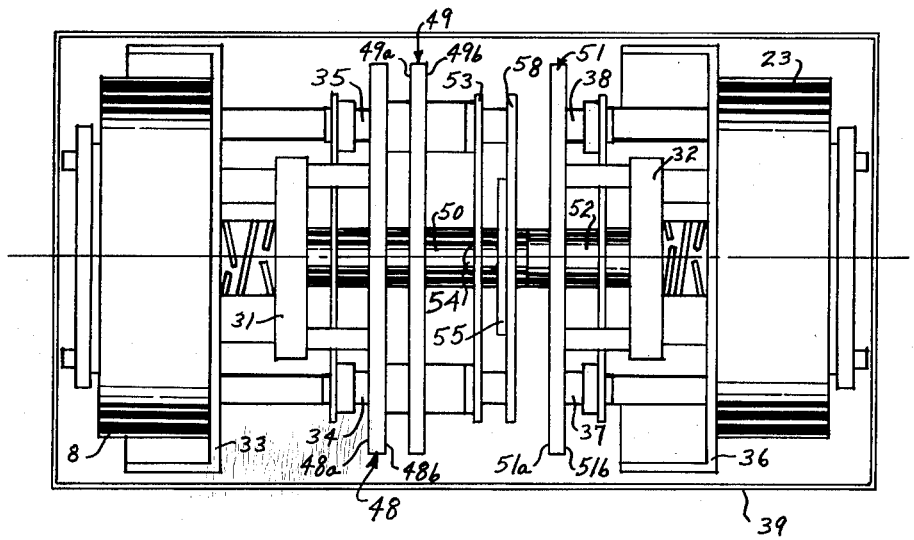
Figure 3:
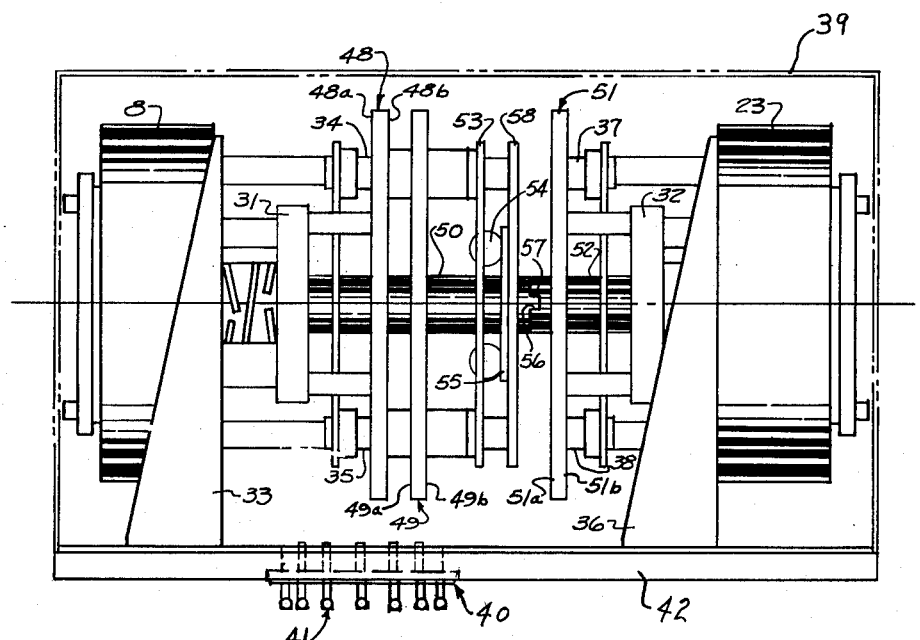
FIG. 3 is a right side view of the electro-mechanical apparatus embodying the principles of the present invention; and, FIG. 4 is a top plan view of the structure illustrated in FIG. 3.

To further explain the operation of the specific example of the present invention reference is made to the electrical wiring diagram shown in FIG. 2 which also illustrates the wafer structure of the illustrative embodiment of FIGS. 3 and 4. The same reference numerals are used through FIGS. 1–4.

A right side view with the housing wall removed of an electromechanical structure embodying the principles of the invention is shown in FIG. 3 and a top view of this structure is shown in FIG. 4. The hermetically sealing cover 39 and the hermetically sealed terminal header 40, with terminals generally indicated by the numeral 41, are shown assembled to the base plate 42 in FIGS. 3 and 4.

The front rotary solenoid increase drive motor 8 and the rear rotary solenoid decrease drive motor 23 may be of any suitable type as that available from G. H. Leland Inc., 123 Webster Street, Dayton 2, Ohio, and described in U.S. Patent No. 2,496,880 issued February 7, 1950. The commutating interrupter switches and cam assemblies 31 and 32 are shown in detail in the G. H. Leland Inc., United States Patent No. 2,501,950, issued March 28, 1950.

Briefly, the rotary solenoid motors 8 and 23 provide the unidirectional rotary motion in the increase and decrease directions to drive the ganged wafer type switches which constitute the electrical switching portion of the invention.

The switch wafers 48 and 49 are fixedly connected to the mounting bracket 33 by any suitable means as by the elongated bolts 34 and 35. The switch wafer 51 is fixedly connected to the mounting bracket 36 by any suitable means as by the elongated bolts 37 and 38. The wafers 48, 49 and 51 are disposed around the wafer rotors 63, 87 and 83, respectively as shown in FIG. 2. The wafer rotors 63 and 87 are fixedly mounted on the front increase shaft 50 and the wafer rotor 83 is fixedly mounted on the rear decrease shaft 52 as shown in FIG. 2. The front shaft 50 has a keybar protrusion 56 machined on its rearmost end which inserts in a close fitting slot 57 machined into the front end of the rear shaft 52, as shown in FIG. 3. This assembles the two shafts into intimate coupling such that rotation of either shaft will cause the other to rotate in unison and the angular index position each shaft assumes will be identical. The front and rear sides of the wafers 48, 49 and 51 are indicated by these reference numbers followed by the subscripts "a" and "b," respectively.

Energization of the front rotary solenoid increase drive motor 8 rotates the switch wafer rotors 63, 87 and 83 in the clockwise increase direction as observed from the front of the assembly, while energizing the rear rotary solenoid decrease drive motor 23 rotates the switch wafers 63, 87 and 83 in the counter-clockwise or decrease direction as observed from the front of the assembly.

The detent mechanism holds the shafts 50 and 52 in their indexed positions and includes spring 53, the spring plate 58, balls 54 and hole plate 55. The spring 53 and spring plate 58 are fixed to the bolts 34 and 35 and hold the ball bearing 54 in one hole out of eighteen equally spaced holes placed in the hole plate 55 thus holding the shafts 51 and 52 in the proper angular position after the actuated rotary solenoid motor 8 or 23 has completed its operation. The plate 55 is fixed to the shaft 50.

The circuit wiring diagram and switch wafer layouts are shown in FIG. 2. In this figure the front view of each wafer switch element is shown as viewed from the front rotary solenoid motor 8 and the rear view of each wafer switch element is shown as viewed from the rear rotary solenoid motor 23.

The front 48a of switch wafer 48 shows the cam operated interrupter switch 31 with the long contact clip 61 interconnected to the short contact clip 62 through the notched rotor conducting ring 63a. This interrupter switch section performs the automatic index through the eighteenth position when the actuating signal is applied to the front rotary solenoid increase motor 8. The rear section of switch wafer 51b performs a similar function by identical means via contact clips 59 and 60 when the actuating signal is applied to the rear rotary solenoid decrease motor 23, causing automatic indexing through the eighteenth position in the opposite rotation.

The switching functions performed by the circuitry of the described form of the invention are shown schematically in FIG. 1 and herein described.

The structure which performs the proper switching operations is contained in the arrangement of the switch section rotor and contact clip arrangements shown in FIG. 2, as these arrangements are operated by the rotary solenoid drive motors 8 and 23 and mechanical interconnecting mechanisms shown in FIG. 3 as herein described.

The wiring diagram and layout of the switch wafer and rotor assemblies are shown in FIG. 2. In this figure the front views of the wafer layouts are observed from the front rotary solenoid increase motor 8 to obtain angular position relationship (left side of FIG. 3), and the rear wafer layouts are observed from the rear rotary solenoid (right side of FIG. 3) in proper angular position relation to the front views.

The voltage divider circuit is arranged on the rear section 49b of the wafer 49 wherein the input positive lead is connected from terminal 1 by lead 71 to the seventeenth position short contact spring 72, and through the interconnecting resistor 73 to the sixteenth position short contact spring 74. The resistor 75 interconnects the sixteenth position short contact spring 74 to the fifteenth position short contact spring 77, and in like manner subsequent resistors interconnect each set of the remaining short contact springs in series connection proceeding to the first position short contact spring 78. Lead 79 connects the first position short contact spring to terminal 29 to which the negative terminal of the voltage divider source or battery will be connected. The positions referred to in FIG. 2 are angular positions of the contact clips on the wafer, where position one is at contact clip 78 which is contact point 28 in FIG. 1.

The long contact spring 81 on wafer 49b connects the lead 82, and thereby terminal 5, to the contacting rear section wafer rotor conducting ring 87b, which in turn makes connection to any of the short contact springs as 72, 74 and 77 via the rear section tab on rotor conducting ring 87b, said tab shown in connection with short contact clip 78 in FIG. 2. The divided voltage is hereby provided at the terminal 5 with reference to either terminal 1 or terminal 29. The long contact clip 81 with the rotor 87b form the embodiment of the voltage divided wiper arm 6.

A single pole single throw switching operation is performed between terminals 18 and 19 by connection of the lead 85 from terminal 18 to the short contact spring 86 in position twelve of the front section of wafer 49a. When the wafer rotor conducting ring 87a has its tab in position twelve the short contact spring 86 will be connected to the short contact spring 88. Lead 89 completes the circuit connection to terminal 19. This circuit will be connected only when the rotor is advanced to the prescribed terminal point 22 in FIG. 1 from either direction and will be disconnected for all other positions. This is then the embodiment of switch 20 and contact 21 shown in FIG. 1.

A double pole single throw switching operation is performed to connect terminal 12 to either of terminals 13 or 17. In the form of the invention shown the terminal 12 is connected via lead 91 to long spring contact clip 93 which makes connection to the notched rotor conducting ring 63 on the rear section 48b of wafer 48. The short contact spring clip 96 makes connection to rotor conducting ring 63b except when the rotor notch is indexed into the specified position which is the point position of wiper arm 6 as shown in FIG. 1. At the same time the terminal 12 is connected via lead 91, interconnection at long spring contact clip 93, and by lead 97 to short contact clip 98 on front of wafer 49. Then when the rotor conducting plate 87a is indexed into the specified position, the tab on rotor 87a interconnects short contact clips 98 and 99 and via lead 101 makes connection to terminal 13. Thus, in the aforementioned specified position the notched rotor conducting ring 63b disconnects terminal 17 from terminal 12 and the tab rotor conducting ring 87a connects terminal 13 to terminal 12 performing the desired function. The width and angular position of the notch on rotor conducting ring 63b and the width and angular position of the tab on rotor conducting ring 87a are able to be arranged to disconnect the circuit between terminals 12 and 17 before the circuit between 12 and 13 is connected. Further, the circuit between 12 and 13 may be disconnected prior to reconnection of the circuit between terminals 12 and 17. This is a break-before-make sequence. In a similar manner a make-before-break switching action may be obtained by adjustment of the notch on rotor conducting ring 36b and the tab, on rotor conducting ring 97a in both width and angular position. This is then the embodiment of switch 14 and contacts 15 and 16 shown in FIG. 1.

The wafer 48a and wafer rotor conducting ring 63a are arranged to cause a double index to occur in conjunction with cam operated interrupter switch 31 whenever terminal 11 and terminal 7 or 9 are energized to actuate the front rotary solenoid increase motor 8 causing index from position seventeen (point 3 on FIG. 1) through position eighteen (point 30) to position one, (point 28). Then, the rear wafer 51b performs the same function as front wafer 48a in conjunction with cam operated interrupter switch 32, whenever terminal 11 and terminal 24 or 26 are energized to actuate the rear rotary solenoid decrease motor 23 causing index from position one to position seventeen. Both interrupter switches 31 and 32 are shorted and made ineffective by the notched rotors and associated long and short contact clips of wafer assemblies 48 and 51, in all positions where automatic indexing is not desired.

What we claim is:

1. A bi-directional voltage divider stepper switching apparatus, comprising; a base; a voltage increase solenoid drive motor mounted on said base for rotation in one direction; a voltage decrease solenoid drive motor mounted on said base in a position spaced from said voltage increase motor for rotation in the opposite direction; each of said motors having a drive shaft extending outwardly therefrom; said drive shafts being connected for simultaneous indexing rotation thereof; means for retaining said shafts in their indexed positions; a plurality of fixed switch wafers disposed about said shafts; an integral wafer rotor mounted on said shafts within and adjacent to each of said fixed switch wafers; a voltage divider circuit having a plurality of switch points mounted on one of said fixed switch wafers; said voltage divider circuit including a fixed resistance of a predetermined selected value interposed between each adjacent switch point to provide at each switch point selected portions of the voltage being divided; a wiper arm on the wafer rotor adjacent the voltage divider circuit switch wafer for operative engagement with said voltage divider circuit; a motor control circuit for selective energization of said motors including interrupter switch means for automatically operating a selected one of said motors at any predetermined switch point wherein a single external signal will cause a multiple index movement of the wiper arm past any selected switch points; and, connecting circuits including switching means for completing connection of external circuits comprising contact elements mounted on said fixed switch wafers and wherein the adjacent wafer rotors will interconnect these contact elements at predetermined switch points in selected relation to the operation of the voltage divider circuit to provide predetermined connections of any number of external or internal circuits as selected.

2. A bi-directional voltage divider stepper switching apparatus, comprising: a base; a voltage increase solenoid drive motor mounted on said base for rotation in one direction; a voltage decrease solenoid drive motor mounted on said base in a position spaced from said voltage increase motor for rotation in the opposite direction; each of said motors having a drive shaft extending outwardly therefrom; said drive shafts being connected for simultaneous indexing rotation thereof; means for retaining said shafts in their indexed positions; a plurality of fixed switch wafers disposed about said shafts; an integral wafer rotor mounted on said shafts within and adjacent to each of said fixed switch wafers; a voltage divider circuit having a plurality of switch points mounted on one of said fixed switch wafers; said voltage divider circuit including a fixed resistance of a predetermined selected value interposed between each adjacent switch point to provide at each switch point selected portions of the voltage being divided; a wiper arm on the wafer rotor adjacent the voltage divider circuit switch wafer for operative engagement with said voltage divider circuit; a motor control circuit for selective energization of said motors including interrupter switch means for automatically operating a selected one of said motors at any predetermined switch point wherein a single external signal will cause a multiple index movement of the wiper arm past any selected switch points; and connecting circuits including switching means comprising contact elements mounted on said fixed switch wafers and wherein the adjacent wafer rotors will disconnect these contact elements at predetermined switch points for disconnecting external actuating signals applied to operate the voltage increase motor or the voltage decrease motor and therefore prevent operation of one or the other or both of the motors at any selected switch points.

3. A bi-directional voltage divider stepper switching apparatus, comprising: a base; a voltage increase solenoid drive motor mounted on said base for rotation in one direction; a voltage decrease solenoid drive motor mounted on said base in a position spaced from said voltage increase motor for rotation in the opposite direction; each of said motors having a drive shaft extending outwardly therefrom; said drive shafts being connected for simultaneous indexing rotation thereof; means for retaining said shafts in their indexed positions; a plurality of fixed switch wafers disposed about said shafts; an integral wafer rotor mounted on said shafts within and adjacent to each of said fixed switch wafers; a voltage divider circuit mounted on one of said fixed switch wafers; said voltage divider circuit including a fixed resistance of a predetermined selected value interposed between each adjacent switch point to provide at each switch point selected portions of the voltage being divided; a wiper arm on the wafer rotor adjacent the voltage divider circuit switch wafer for operative engagement with said voltage divider circuit; a motor control circuit for selective energization of said motors including interrupter switch means for automatically operating a selected one of said motors at any predetermined switch point wherein a single external signal will cause a multiple index movement of the wiper arm past any selected switch points; connecting circuits including switching means for completing connection of external circuits comprising contact elements mounted on said fixed switch wafers and wherein the adjacent wafer rotors will interconnect these contact elements at predetermined switch points in selected relation to the operation of the voltage divider circuit to provide predetermined connections of any number of external or internal circuits as selected; and, connecting circuits including switching means comprising contact elements mounted on said fixed switch wafers and wherein the adjacent wafer rotors will disconnect these contact elements at predetermined switch points for disconnecting external actuating signals applied to operate the voltage increase motor or the voltage decrease motor and therefore prevent operation of one or the other or both of the motors at any selected switch points.

References Cited in the file of this patent

UNITED STATES PATENTS

| | | |
|---|---|---|
| 2,512,989 | Aicher | June 27, 1950 |
| 2,707,735 | Cohn | May 3, 1955 |
| 2,818,750 | Kwasniewski | Jan. 7, 1958 |
| 2,913,694 | Heselwood | Nov. 17, 1959 |
| 3,010,059 | McLaughlin et al. | Nov. 21, 1961 |